United States Patent [19]

Larsen et al.

[11] 3,734,689
[45] May 22, 1973

[54] PROCESS FOR SEPARATION OF HAFNIUM FROM ZIRCONIUM

[75] Inventors: Edwin M. Larsen, Madison, Wis.; Francisco C. Gil-Arnao, San Bernardino, Caracas, Venezuela

[73] Assignee: Wisconsin Alumni Research Foundation, Madison, Wis.

[22] Filed: Feb. 7, 1969

[21] Appl. No.: 797,683

[52] U.S. Cl. ............................................. 423/71
[51] Int. Cl. ............................................. C22b 59/00
[58] Field of Search ......... 23/15–18, 87, 20, 21, 24 Z

[56] References Cited

UNITED STATES PATENTS

| 3,057,686 | 10/1962 | Muetterties | 423/347 |
| 3,088,804 | 5/1963 | McClelland | 423/296 |
| 2,744,060 | 5/1956 | Eaton | 23/87 X |
| 2,791,485 | 5/1957 | Newnham | 23/16 |
| 2,916,350 | 12/1959 | Newnham | 23/18 |
| 2,961,293 | 11/1960 | Newnham | 23/16 |

OTHER PUBLICATIONS

Mellor, "Comprehensive Treatise on Inorganic and Theoretical Chemistry," Vol. 7, 1927, p. 143.

*Primary Examiner*—Herbert T. Carter
*Attorney*—McDougall, Hersh, Scott & Ladd

[57] ABSTRACT

A process for separating hafnium from zirconium wherein the tetrahalides of the metals are reacted with a metal selected from the group consisting of aluminum and zirconium in finely divided form in the presence of an aluminum trihalide at a reaction temperature above the melting point temperature for the aluminum trihalide whereby the reaction is carried out in a liquid system with preferential reduction of the zirconium component over the hafnium component to enable separations therebetween.

13 Claims, No Drawings

PROCESS FOR SEPARATION OF HAFNIUM FROM ZIRCONIUM

The invention described herein was made in the course of or under a grant from the National Science Foundation, an agency of the United States Government.

This invention relates to the separation between zirconium and hafnium and more particularly to the removal of hafnium from the presence of zirconium for the production of zirconium in which hafnium is reduced to acceptable levels.

Known sources of zirconium contain hafnium in amounts ranging from about 1.4 percent to 3 percent by weight hafnium in naturally occurring ores such as zircon, to about 15 percent to 20 percent by weight hafnium in pegmatite deposits. There are many instances wherein it is desirable to make use of zirconium in which hafnium is considered to be an undesirable contaminant, even when present in such low concentrations. For example, widespread use is being made of zirconium as a construction material in nuclear reactors. Hafnium has a high cross-section capture for thermal neutrons by comparison with zirconium such that zirconium which is relatively freed of hafnium is desirable for such applications.

Various physico-chemical separation techniques have been proposed, such as fractional distillation, fractional precipitation, fractional crystallization and ion exchange processes, but none, to the present, have found commercial acceptance. The process which is currently employed for separation of hafnium from zirconium involves the steps of converting the naturally occurring metals in the form of their silicates to the corresponding metal tetrachlorides, taking the tetrachlorides into aqueous solution to form a two-phase separation of zirconium and hafnium, treatment of the separated phase for recovery of zirconium as the oxide, reconversion of the oxide to the corresponding tetrachloride and preparation of the metal from the tetrachloride, as by magnesium reduction. It will be apparent that the described process entails a large number of processing steps with corresponding high cost in material, equipment and labor.

It is an object of this invention to provide a method for the removal of hafnium from zirconium in a simple and efficient procedure, which greatly reduces the number of processing steps required to achieve a more purified product, which permits the recovery of zirconium in high yield and with marked reduction in the amount of hafnium present to levels below the level of tolerance for nuclear reactors, and in which the process can be adapted to substantially continuous operation.

The concepts of this invention make use of the preferential reduction of zirconium tetrahalide over hafnium tetrahalide in a mixture of zirconium and hafnium tetrahalides when the reduction is carried out with aluminum and/or zirconium in finely divided form in the presence of aluminum trihalide. The reactions are believed to be represented by the following ideal equations shown for the chloride system:

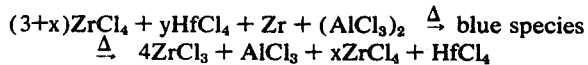

Actually the $ZrCl_3$ has a range of stoichiometry of $ZrCl_{(2.5-3.0)}$. The aluminum chloride, any unreacted zirconium tetrachloride and unreacted hafnium tetrachloride are capable of removal by sublimation to leave the zirconium trichloride as a product from which the purified zirconium can be recovered by well known techniques.

Separation of zirconium from hafnium by preferential reduction of the corresponding tetrahalides has previously been described by Newnham in U.S. Pat. No. 2,791,485, but the reaction is a solid-gas phase wherein the reaction product grows on the metal surfaces and therefore quenches the reaction before completion. The result is a poor yield and low efficiency from the standpoint of material utilization, equipment and labor costs.

On the other hand, preferential reduction between zirconium and hafnium tetrahalides with zirconium and/or aluminum metal in the presence of aluminum trihalide permits reaction to take place in a liquid system wherein the reaction occurs at a more rapid rate throughout the cross-section of the material and at a substantially lower temperature to give an entirely different result. It has been observed that the initial product of the reaction is a blue substance, hereinafter referred to as a blue species which has not yet been identified, and which gradually converts, when all of the metallic component has been utilized or upon completion of the reaction, to a colorless liquid from which the unreacted zirconium tetrahalide, unreacted hafnium tetrahalide and aluminum halide can be eliminated by sublimation or from which the insoluble zirconium trihalide can be separated from the liquid system by filtration, centrifugation or the like.

Although not as effectively or efficiently as with the chlorides, the described separation of hafnium from zirconium by preferential reduction, in accordance with the practice of this invention, can be carried out with the corresponding bromides or iodides except for slight differences in reaction conditions, depending somewhat upon the halide, as will hereinafter appear. Thus the reduction reaction for the conversion of the tetrahalide to the trihalide with the intermediate formation of the blue species can be carried out with zirconium and hafnium supplied as a mixture in the form of the tetrachloride, tetrabromide or tetraiodide.

As the reducing metal, use can be made of either zirconium or aluminum or mixtures thereof. The reducing metal is preferably employed in stoichiometric amounts, based upon the amount of zirconium tetrahalide; however, satisfactory results can be secured with the amount of tetrahalide to reducing metal deviating slightly from the stoichiometric amounts such as ± 10 percent. When the presence of zirconium is not detrimental to the product, the amount of zirconium metal may exceed the stoichiometric ratio of 1 mole of the metal to 3 moles of the tetrahalides. The reducing metal is preferably employed in particulate form, such as particles of 40 mesh to less than 325 mesh and preferably within the range of 80–200 mesh.

Instead of aluminum chloride, use can be made of other aluminum trihalides such as aluminum tribromide, aluminum triiodide and preferably aluminum trichloride. The aluminum trihalide should be employed in an amount sufficient to provide a liquid system under the conditions for reaction. In the preferred practice of this invention, it is preferred to make use of an amount of aluminum trichloride or other trihalide within the range of 50–90 mole percent and preferably within the range of 70–90 mole percent, when calculated in the form of the dimer $Al_2Cl_6$. For best practice, it is desirable to make use of a ratio of aluminum trichloride dimer to zirconium tetrachloride in an amount greater than 5 to 1.

The temperature for the reaction has for its very minimum the melting point temperature of the aluminum halide -zirconium tetrahalide mixture, which for aluminum trichloride at about 76 mole percent is 165° C. The maximum temperature can be identified as the temperature range at which excessive thermal dissociation or breakdown occurs which, in the systems described, appears to be about 400°–500° C. Actually, it has been found that the reaction for preferential reduction begins to occur about 100° C above the melting point temperature for the aluminum trihalide - zirconium tetrahalide mixture, such as at a temperature above 250°–265° C for the chloride and bromide systems and a temperature above 300° C for the iodide systems. Within this range it is preferred to operate at a temperature within the range of 250°–275° C for the tetrachloride and tetrabromide and 300°–325° C for the tetraiodide. Reaction pressure is autogenous pressure and therefore is temperature dependent, consistent with the maintenance of the materials in liquid phase under the temperature conditions existing.

It is desirable to carry out the reaction in substantially complete absence of oxygen and moisture and preferably, though not essentially, in an atmosphere of an inert gas, such as argon, nitrogen and the like.

The following examples are given by way of illustration, but not by way of limitation, of the practice of this invention.

EXAMPLE 1

This example illustrates the separation of hafnium from zirconium from a mixture of equal molecular proportions of zirconium tetrachloride and hafnium tetrachloride. The reactor is in the form of an elongate tubular member of pyrex glass having a bulbous portion at one end in which the materials are loaded for reaction. The tubular member is purged with nitrogen and a high vacuum is drawn on the interior before it is sealed with the reactants in the bulbous portion. It will be understood that the pressure buildup within the reactor will depend upon the temperature of the reaction and the vapor pressure of the materials therein under reaction temperature.

The reactor is charged with 0.01 mole zirconium tetrachloride, 0.01 mole of hafnium tetrachloride, $7.5 \times 10^{-2}$ mole of aluminum trichloride ($Al_2Cl_6$), and $7.4 \times 10^{-3}$ moles of aluminum (80–100 mesh). The reaction vessel is heated in a furnace to 260° C for reaction. In the course of the reaction, a blue species forms at the surface of the metal particles while the metal is consumed and the brown product forms concomitant with a reduction in intensity of the blue color, then a clear colorless liquid phase is formed indicating the end of the reaction (about 72 hours).

The reaction tube is partially withdrawn from the furnace so that the bulbous portion containing the reaction product remains exposed to the heat of the furnace while the opposite length of the reaction tube is outside the furnace. While still maintaining the furnace at 260° C, sublimation takes place as evidenced by condensation in the cold portion of the reaction vessel outside the furnace to effect removal of the aluminum trichloride, zirconium tetrachloride and unreacted hafnium tetrachloride. The brown product, remaining in the bulbous portion of the tubing after sublimation, was analyzed. From the original mixed tetrahalides having a Hf/Zr mole ratio of 1, the brown product, identified as zirconium trichlorides $ZrCl_{(2.5-2.8)}$, has a Hf/Zr mole ratio of 0.0582, corresponding to a separation factor of 17.2.

EXAMPLE 2

The reaction vessel of Example 1 was loaded with 2.33 grams (0.01 mole) of zirconium tetrachloride having a Hf/Zr mole ratio of $9.8 \times 10^{-3}$, and $3.75 \times 10^{-2}$ moles of aluminum trichloride and $3.7 \times 10^{-3}$ moles of aluminum (90–100 mesh), and inserted into the furnace for reaction at 260° C. The blue species forms after which the brown powder begins to form as an insoluble reaction product concomitant with a reduction in the intensity of the blue species and final return to a clear colorless liquid.

Analysis shows a reduction of the hafnium in the resulting trichloride from the original Hf/Zr mole ratio of $9.8 \times 10^{-3}$ to Hf/Zr mole ratio of $4.9 \times 10^{-4}$ for a separation factor of about 20.

The foregoing examples give a clear indication of the availability of the process for the separation of hafnium from zirconium.

In commercial practice, the process can be carried out in a batch or continuous operation, since the brown product is insoluble in the liquid melt of aluminum trichloride while the zirconium tetrachloride and hafnium tetrachloride remain dissolved therein. This permits separation of the brown product by filtration or centrifugation to remove the brown product as a filter cake which is thereafter preferably washed with a fresh increment of molten aluminum chloride for purification. Aluminum chloride entrained with the product can be removed by a rinse or wash with a suitable solvent in which the aluminum trichloride is soluble but the product is insoluble, such as organic ethers or alcohols or preferably a low melting point alkali metal eutectic.

The zirconium trichloride, separated from the remainder of the reaction product, can be reconverted by a disproportionation reaction at about 500° C to zirconium dichloride and zirconium tetrachloride in accordance with the following disproportionation reaction:

$$2\ ZrCl_3 \overset{\Delta}{\rightarrow} ZrCl_2 + ZrCl_4$$

Disproportionation of zirconium tribromide or triiodide will occur under similar conditions.

The zirconium tetrachloride can be reduced to purified zirconium by conventional reactions well known to the skilled in the art, such as by magnesium reduction.

EXAMPLES 3 – 8

The following examples will illustrate the practice of the invention in which the metal halides are represented by the tetrachloride, tetrabromide and tetraiodide and in which the metal is zirconium or aluminum in flake form. The following tabulations set forth the amount of material employed and the conditions for reaction as well as results.

As in the previous examples, the tetrahalide, aluminum trihalide and metal flakes are heated to the indicated reaction temperatures for the number of days indicated, otherwise the procedure is substantially the same as in the preceding examples:

TABLE I

| | Example 3 | Example 4 |
|---|---|---|
| gms $ZrCl_4$ | 4.024 | 4.022 |
| moles $ZrCl_4$ | $1.727 \times 10^{-2}$ | $1.726 \times 10^{-2}$ |
| gms $AlCl_3$ | 14.946 | 15.118 |
| moles $AlCl_3$ | 0.1121 | 0.1134 |
| metal | Zr flakes | Al flakes |
| gm M | 0.3186 | 0.0933 |
| moles M | $3.493 \times 10^{-3}$ | $3.458 \times 10^{-3}$ |
| $ZrX_4/M$ | 4.95 | 4.99 |
| mole % $Al_2Cl_6$ | 76.4 | 76.6 |
| Temp. | 260°, 300° | 260° |
| Time (days) at temp. immediately above | 8 1 | 6 |
| initial Hf/Zr × 10² mole ratio | 0.981 | 0.981 |
| final Hf/Zr × 10² mole ratio | 0.092 | 0.173 |
| Sepn. factor Ri/Rf | 10.7 | 5.7 |

TABLE II

| | Example 5 | Example 6 |
|---|---|---|
| gms $ZrBr_4$ | 3.59 | 4.14 |
| moles $ZrBr_4$ | $0.874 \times 10^{-2}$ | $1.008 \times 10^{-2}$ |
| gms $AlBr_3$ | 25.94 | 17.61 |
| moles $AlBr_3$ | $9.726 \times 10^{-2}$ | $6.603 \times 10^{-2}$ |
| metal | Zr flakes | Al flakes |
| gm M | 0.1583 | 0.0543 |
| moles M | $1.735 \times 10^{-3}$ | $2.012 \times 10^{-3}$ |
| $ZrX_4/M$ | 5.01 | 5.02 |
| mole % $Al_2Br_6$ | 76.6 | 84.8 |
| Temp. | 290° | 295° |
| Time (days) | 32 | 32 |
| Initial Hf/Zr × 10² mole ratio | 0.910 | 0.910 |
| Final Hf/Zr × 10² mole ratio | 0.152 | |
| Sepn. factor Ri/Rf | 6.0 | |

TABLE III

| | Example 7 | Example 8 |
|---|---|---|
| gms $ZrI_4$ | 3.989 | 4.040 |
| moles $ZrI_4$ | $6.66 \times 10^{-3}$ | $6.75 \times 10^{-3}$ |
| gms $AlI_3$ | 17.970 | 17.836 |
| moles $AlI_3$ | $4.407 \times 10^{-2}$ | $4.374 \times 10^{-2}$ |
| metal | Zr flakes | Al flakes |
| gms M | 0.1231 | 0.0372 |
| moles M | $1.349 \times 10^{-3}$ | $1.379 \times 10^{-3}$ |
| $ZrX_4/M$ | 4.94 | 4.89 |
| mole % $Al_2I_6$ | 76.8 | 76.4 |
| Temp. | 310°–335° | 310°–360° |
| Time (days) | 2 18 | 2 18 |
| Initial Hf/Zr mole ratio | 0.910 | 0.910 |
| Final Hf/Zr mole ratio | 0.319 | 0.403 |
| Sepn. factor Ri/Rf | 2.9 | 2.3 |

It will be evident by comparison of the above data that the chloride system is far more effective than the reactions based upon the tetrabromides or tetraiodides, with the bromide system being more effective than the iodide.

The appearance of the blue species, while less visual in the iodide system because of the intensity of the red coloration, is indicative of a unique character of the process. The blue species does not appear from the combination of aluminum trihalide and zirconium tetrahalide in the amounts described but it begins to form immediately in response to the addition of zirconium or aluminum metal. Since the blue species is soluble in the melt of aluminum halide, the entire melt becomes blue upon solution therein.

The blue species has not been identified to the present but it appears to be a reduced state species that exists only while zirconium or aluminum metal is present. The nature of the blue species may be due to one of the lower oxidation states of aluminum or zirconium since neither the blue species nor the blue color develop in a hafnium system when reacted instead of a zirconium system.

There are indications that the presence of aluminum trihalide is essential to the formation of the blue species and the blue melt as intermediates in the separation of the zirconium trihalide. In addition to being a solvent for the reduced species and providing a liquid system for the macrocrystalline products, there is reason to believe that aluminum trihalide provides a mechanistic pathway for the described reaction which differs materially from that of the more familiar gas-solid system described in the aforementioned patent.

The blue species seems to be unstable in the presence of large excesses of aluminum trihalide. This may be due to an aluminum trihalide catalyzed temperature dependent disproportionation reaction. On the other hand, excess zirconium tetrahalide does not seem to interfere with the formation of the blue species or the brown product in the case of zirconium trichloride or the brown product in the case of zirconium tribromide.

It will be apparent from the foregoing that we have provided a simple and effective means for the separation of hafnium from zirconium to produce zirconium in a high state of purity.

It will be understood that changes may be made in the details of formulation and operation without departing from the spirit of the invention, especially as defined in the following claims.

We claim:

1. In a process for separation of hafnium and zirconium, the steps of reacting a mixture consisting essentially of hafnium and zirconium in the form of their tetrahalides with aluminum trihalide and a metal selected from the group consisting of aluminum and zirconium at a temperature above the melting point temperature for the aluminum trihalide - zirconium tetrahalide mixture, said aluminum trihalide being employed in an amount sufficient to provide a liquid system under reaction conditions whereby zirconium is preferentially reduced to an insoluble lower valence state compound by comparison with hafnium under conditions whereby the unreacted hafnium tetrahalide can be volatilized off for separation from the reacted insoluble zirconium compound and separating unreacted hafnium tetrahalide from reacted insoluble zirconium compounds.

2. In a process as claimed in claim 1 in which the zirconium and hafnium tetrahalide is in the form of the tetrachloride, tetrabromide or tetraiodide.

3. In a process as claimed in claim 1 in which the aluminum trihalide is in the form of the trichloride, tribromide or triiodide.

4. In a process as claimed in claim 1 in which the metal is provided in finely divided form.

5. In a process as claimed in claim 1 in which the reaction is carried out at autogenous pressure in a nonoxidizing dry atmosphere.

6. In a process as claimed in claim 1 in which the reaction is carried out at a temperature above 200° C when the aluminum trihalide is in the form of the trichloride or tribromide and above 300° C when in the form of the triiodide but with a maximum temperature below 500° C.

7. In a process as claimed in claim 1 in which the metal is present in at least stoichiometric amounts.

8. In a process as claimed in claim 1 in which the metal is present in an amount within the range of a stoichiometric amount ± 10 percent.

9. In a process as claimed in claim 1 in which the aluminum trihalide is present in the ratio of aluminum trihalide to zirconium and hafnium tetrahalide of at least 5 to 1.

10. In a process as claimed in claim 1 in which the aluminum trihalide is present in the reaction mixture in an amount within the range of 50–90 mole percent.

11. In a process as claimed in claim 1 in which the aluminum trihalide is present in the reaction mixture in an amount within the range of 70–90 mole percent.

12. In a process as claimed in claim 1 in which the unreacted hafnium tetrahalide, remaining zirconium tetrahalide and aluminum trihalide are separable from the reduced zirconium tetrahalide by sublimation.

13. In a process as claimed in claim 1 in which separation is effected by filtering off the insoluble reduced zirconium tetrahalide from the remaining liquid.

* * * * *